(12) United States Patent
Hossick-Schott et al.

(10) Patent No.: US 7,687,102 B2
(45) Date of Patent: Mar. 30, 2010

(54) METHODS AND APPARATUS FOR PRODUCING CARBON CATHODES

(75) Inventors: Joachim Hossick-Schott, Minneapolis, MN (US); Heiko Specht, Aschaffenburg (DE); Frank Kruger, Bruchköbel (DE); Oliver Keitel, Aschaffenburg (DE)

(73) Assignees: Medtronic, Inc., Minneapolis, MN (US); W.C. Heraeus GmbH & Co., Hanau (DE)

( * ) Notice: Subject to any disclaimer, the term of this patent is extended or adjusted under 35 U.S.C. 154(b) by 1167 days.

(21) Appl. No.: 10/903,685

(22) Filed: Jul. 30, 2004

(65) Prior Publication Data

US 2005/0098242 A1 May 12, 2005

Related U.S. Application Data

(60) Provisional application No. 60/514,371, filed on Oct. 23, 2003, provisional application No. 60/514,372, filed on Oct. 23, 2003.

(51) Int. Cl.
*C25B 11/04* (2006.01)

(52) U.S. Cl. .................................. 427/58

(58) Field of Classification Search .............. 427/58, 427/600, 126.1, 314, 421, 79, 376.6, 2.24
See application file for complete search history.

(56) References Cited

U.S. PATENT DOCUMENTS

| | | | | |
|---|---|---|---|---|
| 4,609,597 A | * | 9/1986 | Plasse | 429/122 |
| 4,675,254 A | * | 6/1987 | Shuster et al. | 429/51 |
| 5,119,274 A | * | 6/1992 | Kinuta et al. | 361/525 |
| 5,654,031 A | * | 8/1997 | Delmore et al. | 427/8 |
| 5,844,770 A | | 12/1998 | Fries-Carr et al. | |
| 5,922,131 A | * | 7/1999 | Haas | 118/629 |
| 6,119,706 A | * | 9/2000 | Foederl et al. | 134/76 |
| 6,331,332 B1 | | 12/2001 | Wang | |
| 6,413,282 B1 | * | 7/2002 | Tanahashi et al. | 29/25.03 |
| 6,449,140 B1 | * | 9/2002 | Sakai et al. | 361/532 |
| 6,660,340 B1 | | 12/2003 | Kirkpatrick | |
| 6,733,923 B2 | | 5/2004 | Yun et al. | |
| 7,002,790 B2 | * | 2/2006 | Hossick-Schott et al. | 361/516 |
| 7,083,115 B2 | * | 8/2006 | Huffman | 239/135 |
| 7,224,576 B2 | | 5/2007 | Hossick-Schott | |
| 7,277,770 B2 | * | 10/2007 | Huang | 700/121 |
| 7,351,500 B2 | * | 4/2008 | Ueda et al. | 429/231.95 |
| 2001/0026850 A1 | * | 10/2001 | Shah et al. | 427/600 |
| 2003/0039887 A1 | | 2/2003 | Yun et al. | |

(Continued)

FOREIGN PATENT DOCUMENTS

EP 0084891 * 3/1983

(Continued)

*Primary Examiner*—Michael Cleveland
*Assistant Examiner*—Tabassom Tadayyon Eslami
(74) *Attorney, Agent, or Firm*—Harness, Dickey

(57) ABSTRACT

The present invention provides improved cathodes and industrialized methods for producing such cathodes using an industrial dosing valve-based electrode coating fluid emitting technique. The family of cathodes according to the present invention can be produced so that they inhabit a pre-existing metallic surface such as an inner surface of a titanium casing adjacent but insulated from direct electrical communication from an anode. Foil-type valve metal anodes as well as porous valve metal anodes formed from metallic powders may be used in conjunction with the cathodes of the present invention.

32 Claims, 4 Drawing Sheets

U.S. PATENT DOCUMENTS

2004/0043293 A1* 3/2004 Nagata et al. ............ 429/231.8
2005/0089711 A1 4/2005 Hossick-Schott
2005/0090108 A1* 4/2005 Hossick-Schott ........... 438/691
2007/0187000 A1 8/2007 Hossick-Schott

FOREIGN PATENT DOCUMENTS

| WO | WO02/40404 | * | 5/2002 |
| WO | 2006015068 | | 9/2006 |
| WO | WO2006014991 | | 9/2006 |

* cited by examiner

METHODS AND APPARATUS FOR PRODUCING CARBON CATHODES

CROSS REFERENCE TO RELATED APPLICATIONS

The present provisional patent application relates to the subject matter of provisional U.S. patent application Ser. No. 60/514,371 and its corresponding non-provisional patent application Ser. No. 10/816,795 now U.S. Pat. No. 7,224,576 filed on 23 Oct. 2003 and 2 Apr. 2004, respectively, both of which are entitled, "HIGH CAPACITANCE ELECTRODE AND METHODS OF PRODUCING SAME;" and provisional U.S. patent application Ser. No. 60/514,372 and its corresponding non-provisional patent application Ser. No. 10/817,324 now U.S. Pat. No. 2005/0089711 filed on 23 Oct. 2003 and 2 Apr. 2004, respectively, both of which are entitled, "METHODS OF PRODUCING CARBON LAYERS ON TITANIUM METAL;" and non-provisional U.S. patent application Ser. No. 10/692,649 now U.S. Pat. No. 7,342,774 filed 23 Oct. 2003 and entitled, "ADVANCED VALVE METAL ANODES WITH COMPLEX INTERIOR AND SURFACE FEATURES AND METHODS FOR PROCESSING SAME," the contents of each said prior application is hereby fully incorporated by reference herein.

FIELD OF THE INVENTION

The present invention generally relates to improved electrochemical cells; in particular, the present invention provides electrodes for use in batteries and for use with valve metal anodes in capacitors and methods for fabricating such cathodes to produce high energy density capacitors. More particularly, devices and methods of making such cathodes for use in a variety of applications, including without limitation applications such as implantable cardioverter-defibrillators (ICDs), among others.

BACKGROUND OF THE INVENTION

The term "valve metal" represents a group of metals including aluminum, tantalum, niobium, titanium, zirconium, etc., all of which form adherent, electrically insulating metal-oxide films upon anodic polarization in electrically conductive solutions. The performance of valve metal anodes in an actual capacitor depends upon several factors, e.g., the effective surface area of the anodes and cathodes that can be contacted by electrolyte, the dielectric constant of the oxide formed on the metal surface, the thickness of the oxide layer on top of the metal surface, the conductivity of the electrolyte, etc.

In the context of medical devices, capacitors are typically charged and discharged rapidly for delivery of low voltage or high voltage stimuli. Upon or during detection of a potentially lethal arrhythmia, suitable electrical transformer circuitry charges one or more high voltage capacitors using a low voltage battery as a charge source. Then, at an appropriate time the energy stored in the capacitor(s) discharges through a pair of electrodes disposed in or near a patient's heart. The discharged energy is used to terminate the arrhythmia and restore organized cardiac activity. Medical devices that deliver cardioversion and/or defibrillation therapy include automated external defibrillators (AEDs) and ICDs. For purposes of the present invention, an ICD is understood to encompass all medical devices having at least high voltage cardioversion or defibrillation capabilities. In most all medical devices, energy, volume, thickness and mass are critical features. The battery(s) and high voltage capacitor(s) used to provide and accumulate the energy required for the effective cardioversion/defibrillation therapy have historically been relatively bulky and expensive.

Other applications for the electrodes of the present invention include various high-energy density commercial and industrial applications such as batteries among others.

Thus, the medical device and other industries have been working towards smaller battery and capacitor volumes while maintaining high energy density. A family of high capacitance electrodes and methods of producing same in an efficient and industrially robust manner, such as proposed herein, contributes toward the success of these on-going efforts.

SUMMARY

The present invention provides improved cathodes and methods for producing such cathodes for ultimate use in conjunction with valve metal capacitors. The family of cathodes according to the present invention can be efficiently mass-produced so that they inhabit a pre-existing metallic surface such as an inner surface of a titanium casing adjacent to but insulated from direct electrical communication with an anode. Foil-type valve metal anodes may be used in conjunction with the cathodes of the present invention; however, porous valve metal anodes (formed from metallic powders of tantalum, niobium, etc.) are advantageously employed.

One exemplary embodiment of the present invention involves using a robust, industrial-grade fluid dispensing apparatus adapted to controllably emit a specially-prepared conductive fluidic suspension or solution, including a predetermined amount of cathode-suitable material. This specially-prepared conductive fluidic suspension or solution, including a predetermined amount of cathode-suitable material, shall herein be referred to as "specially prepared conductive fluid" or "electrode coating fluid". The inner surface comprises either a discrete piece of titanium and/or a portion of the interior surface of a titanium enclosure, or casing, for the capacitor. That is, all or a portion of the interior of the casing (e.g., each half of a clam-shell type casing, a cover member and a corresponding bottom portion, etc.) or one or more discrete titanium pieces (e.g., plates, pins, pegs, and/or irregularly shaped members) disposed within said casing. In the event that titanium plates are operatively incorporated into an electrolytic capacitor (e.g., disposed between opposing anode members), it is desirable to cover at least a portion of the major opposing surfaces of the plate with electrode coating fluid and perform post-processing according to the present invention. In the event that titanium pins or pegs members are utilized, it is desirable to cover at least the radial portions of the titanium pins or pegs with the electrode coating fluid, although those portions that are embedded into a corresponding bore or aperture in an anode member can also be covered with the electrode coating fluid. In the event that irregularly shaped titanium members are utilized, the exposed surfaces proximate to a portion of anode should be covered with the electrode coating fluid. For details regarding the use of diverse-shaped cathodes, including pins, pegs and irregularly shaped cathode members, the above-noted non-provisional U.S. patent application Ser. No. 10/692,649 (Atty. Dkt. P-10579.00) should be consulted.

In virtually every configuration, the exposed portions of each cathode member opposing or adjacent to an anode member should be covered by a porous separator material. Such separator material can include any of a wide variety of electrolytic paper materials (e.g., kraft paper) or polymer-based materials, including any commercially available separator materials distributed by Celgard Inc. of Charlotte, N.C., among others.

According to certain embodiments of the invention, one or more fluid dispensing valves, operated under computer control, dispense the electrode coating fluid upon one or more titanium substrate members. The substrate can comprise a portion of a roll of titanium, discrete sheets of titanium, or a pre-formed portion of a capacitor casing (e.g., a clam-shell portion, a cover portion, a deep or shallow drawn portion, etc.). The substrate can be disposed on a moveable member, such as a conveyor, a cart, a table capable of swiveling and/or moving in the horizontal and vertical planes or the like that is either manually or automatically controlled to move past and/or about the fluid dispensing valve or valves. The substrate or one or more units can be directly articulated or can be roll-fed to move past the fluid dispensing valve(s) and/or the valve-dispensing head can be articulated for precise spacing therebetween. For example, if a pre-formed cup-shaped substrate unit is used then either the fluid dispensing valve and/or the substrate unit ought to avoid contact, especially with respect to the sidewall portions of the cup. The valve(s) are adapted to emit either individual droplets or a plurality of droplets in the form of a mist. The fluid dispensing valves fluid couple to a reservoir of the electrode coating fluid. The reservoir can be maintained at the ambient pressure of the cathode fabrication facility or can be maintained at a pressure equivalent to, greater than or reduced relative to the ambient pressure as needed to manage droplet emission from the valve. The reservoir can also simply utilize gravity-fed fluidic principles of operation. For example, a simple valve fluidly coupled to an orifice can be utilized according to the invention. The reservoir can optionally include structure for agitating and/or controlling the temperature or content of the electrode coating fluid. For example, an impeller, low frequency or ultrasound radiator, fluid passageways for coolant and the like. One or more sensors can be employed to monitor the temperature or content of the reservoir structure and/or the electrode coating fluid and indicating via a signal whether or not the electrode coating fluid remains within desired operating conditions or parameters. If not, the signal can automatically trigger release of one or more constituent components to the electrode coating fluid in order to return the electrode coating fluid to the desired operating conditions or parameters.

The moveable member and/or the fluid dispensing valves can include motion control and/or machine vision sub-systems. Such motion control and/or machine vision sub-systems promote consistent presentation of the substrate to the fluid dispensing valve(s). In addition, such sub-systems can be utilized to perform quality control or article conformity procedures so that non-conforming articles can be removed or reworked into conformity before additional processing occurs. The rate at which the substrates pass by the fluid dispensing apparatus and the rate at which the electrode coating fluid is dispensed from the valve(s) both affect the ultimate depth or thickness of the electrode coating fluid on the substrate. Using known system control principles, either one or both variables can be controlled to vary the amount and depth of the electrode coating fluid to a desired level.

According to the invention, each substrate member is presented proximate the dispensing valve and a substantially equal distribution of a electrode coating fluid material is deposited thereon. The electrode coating fluid can be dispensed over all or a portion of an appropriate cathode substrate, such as an exposed surface of a titanium sheet, pin, peg or other titanium member. A valve emitting a sequence of individual droplets is advantageously employed if a coating with a precise edge definition is required, for example in a preformed titanium case that is to be welded to a case cover member subsequent to the coating process because no cathode material is allowed to contaminate the weld area. Prior to this invention, masking would have been required to mask all substrate areas in which cathode coating material is undesired. A single valve or multiple valves emitting a plurality of droplets in the form of a mist are advantageously employed if a coating of a large area of substrate, for example a roll-fed sheet of titanium is to be coated. In the event of a titanium sheet that will be a part of the capacitor casing, either opposing valves can simultaneously coat the opposing sides or sequential coatings can be applied to the opposing sides. Optionally, the titanium surface can be etched or roughened and/or portions of the surface can be masked so that the electrode coating fluid impinges only a portion of the available surface area. In addition, the substrate may be heated or cooled prior to, during and/or after receiving the electrode coating fluid.

Many of the details regarding suitable anodes and processing steps for producing such electrodes are known in the art. However, appropriate material serves a significant role in the ultimate selection of the depth of the cathode layer(s) and thus, the capacitance of the cathode members produced according to the present invention. Herein, the application of the electrode coating fluid and post processing assumes the use of a tantalum anode and a fluid electrolyte having compatible electrical characteristics in combination with the family of cathode materials residing on a titanium substrate. In addition, the description of the present invention assumes a titanium casing surrounding the anode, cathode and electrolyte and should be read to include all applicable processes, methods, compositions and structures of the invention as described herein. In addition, the present invention includes one or more fill ports (for introducing a suitable fluid electrolyte into the sealed titanium capacitor case). Also, at least one electrical feedthrough can be coupled through the casing in operative electrical communication with the tantalum anode (or anodes) of the capacitor. The feedthrough typically couples to the tantalum anode via an elongated tantalum conductor that is embedded into a portion of the body of the slug of the tantalum anode. In the embodiments of the invention depicted herein the capacitor comprises a "case negative" configuration wherein the cathode is intimately formed on an interior portion of the casing. In a case negative configuration typically an external electrical tab couples to an exterior portion of the casing to promote effective electrical communication with related circuitry. Also, for those embodiments wherein cathode member(s) reside on a titanium surface spaced and insulated from the casing, at least a second electrical feedthrough provides electrical communication to the cathode member(s). The latter design is referred to as a "case neutral" configuration. While not depicted herein, the inventors consider the case neutral configuration (and the "case positive" configuration, wherein the anode member(s) electrically couple to the capacitor casing) to expressly fall within the ambit of the present invention.

The total capacitance $C_{total}$ of any liquid electrolytic capacitor consists of the sum of the two individual capacitors $C_{anode}$ and $C_{cathode}$ and is expressed by the formula $1/C_{total}=1/C_{anode}+1/C_{cathode}$. In order to maximize $C_{total}$, the capacitance $C_{cathode}$ has to be as large as possible. Thus, the specific capacitance of the cathode should be on the order of about 5-10 milliFarad/cm$^2$ (or larger), with the anode capacitance in the range between about 100 and 500 microFarad.

It is believed that a relatively thin (e.g., greater than about one micrometer-deep layer of carbon) heat-processed layer of carbon deposited onto a titanium substrate meets the foregoing specification for a 250 volt capacitor for an ICD (depending to a degree upon actual processing conditions).

The graphite or carbon material utilized according to the invention can comprise any form of carbon, including graphite, a polymorph of the element carbon, as well as relatively pure forms of carbon black (also known as carbon soot, lamp black, channel black, furnace black, acetylene black, thermal black, etc.

However, as is immediately apparent to those skilled in the art, the present invention is not limited to carbonaceous suspensions or solutions: rather, virtually any kind of material, which can be processed as a suspension or solution and which is suitable as a cathode material in electrolytic capacitors, may be used within the scope of this invention as long as its fluidic characteristics are matched to the droplet or mist ejection characteristics of a piezoelectrically controlled micro-dosing valve or other types of print head(s) having fluid-dispensing valve(s) fluidly coupled thereto. For example, the viscosity, surface tension, solids content and the like. The "industrialized" fluid dispensing valve, according to the present invention, can utilize a wide range of droplet-firing speeds, for example, the range of firing rate includes any appropriate rate from about 60 Hz to 2000 Hz, with a firing rate of about 450 Hz being desirable and at least one suitable ink preparation derived from a graphite paste suspension or source emitted from a system comprising a computer controlled piezoelectric valve. Said system optionally having the following characteristics: a feed pressure of about 1.5 to about 50.0 bar (absolute), a dynamic viscosity of about one to about 2000 mPas, a switching time of about one millisecond (ms), a surface tension of about 25 to about 35 Dynes/cm. Although perhaps perceived as narrow, this industrialized electrode coating fluid enables a wider range of chemistries and opens up applications such as the high-yield and high-throughput high-capacitance cathodes according to the present invention. In addition to the foregoing and according to the teaching of the present invention, so-called "phase change chemistry" preparation or electrode coating fluid can be usefully employed that—typically through exposure to radiation (e.g., infrared or ultraviolet light), elevated or depressed temperature or temperature changes, and/or increased or reduced pressure environment(s)—converts to a more functional material for a given substrate or application following ejection from the valve. Exemplary additives include any material designed to enhance consistency of droplet size (expressed in nano-liters prior to impact on a desired substrate) or pixel size (i.e., discrete area) when disposed upon the substrate. Such additive or vehicle-solutions are then typically driven off during post-processing such as heat-treating, annealing, and/or cathode activation thus eliminating any volatile organic solvents and polymeric material components or the like.

Thus, according to the invention, an electrode coating fluid (e.g., having an appropriate particulate content suspended or dissolved therein) delivered to a substrate via an industrial valve forms high-capacitance cathodes suitable for high energy density capacitors. The electrode coating fluid can contain a variety of components such as glycol, alcohol, distilled water, various solvents and/or other materials to refine the fluidic characteristics of the electrode coating fluid.

In this form of the invention, an electrical signal pulses through a piezoelectric material and causes the material to flex so that a minute volume of fluid is ejected. Such an essentially "cold fluid" process may be favored in the event that the electrode coating fluid would be negatively impacted if heated or boiled. The piezoelectrically activated valves are merely one example of suitable electrode coating fluid-emission apparatus; of course, according to the invention other types of dispensing valves can be employed. In one desirable form of the invention, industrialized micro-valves that were previously used to emit adhesive materials such as relatively viscous glue and the like is advantageously employed.

After the electrode coating fluid is dispensed onto the substrate to a desired consistent depth using a consistent drop size, subsequent post-processing completes the inventive cathodes of the invention. In case a carbonaceous slurry or suspension is being used, such processing includes an annealing step (preferably in a vacuum chamber) at approximately 600-1000 degrees Celsius to advantageously generate a titanium carbide (TiC) layer at the carbon-titanium interface. This processing also eliminates any remaining solvent material (via pyrolysis) and any polymer and other artifacts of the carbon-containing slurry. A second annealing step, also known as the activation step, may then be performed wherein the carbon cathode is annealed under ambient air conditions for about 0.1 to 4 hours at approximately about 200-500 degrees Celsius. To the extent that portions of the carbon layer are not tightly bound, to the titanium substrate same may be removed (e.g., under ultrasound agitation, manual means, or the like).

Other cathode materials suitable for being printed or dispensed onto a metallic substrate in the form of a suspension or solution include oxides of any metal included in one or more of Group VII and Group VIII of the periodic table or chemical precursors for such oxides, e.g., chlorides or nitrides. For example, the metal oxides may include ruthenium dioxide ($RuO_2$), together with the oxide precursor $RuCl3$, iridium dioxide ($IrO_2$), manganese dioxide ($MnO_2$) together with the oxide precursor manganese nitride ($Mn(NO3)2$, silver vanadium oxide, $Ag_2V_4O_{11}$, vanadium pentoxide ($V_2O_5$), titanium dioxide ($TiO_2$), rhenium dioxide ($ReO_2$), osmium dioxide ($OsO_2$), molybdenum dioxide ($MoO_2$), rhodium dioxide ($RhO_2$), vanadium dioxide ($VO_2$), and tungsten dioxide ($WO_2$). The metal oxide may include one or more of these types of oxides and/or may include other metal oxides comprising metals in at least one of Group VII and Group VIII of the periodic table.

It is certainly apparent to those skilled in the art, that the industrial coating method suggested here may be conveniently used to generate a RuO2 cathode layer on a titanium substrate: in a first step, a layer of solution containing RuCl3 dissolved in a lower molecular weight alcohol such as methanol, ethanol or iso-propyl alcohol would be printed onto the titanium surface; in a second step, the RuCl3 layer would be converted to RuO2 by annealing the substrate in air at about 100-400° C. for about 10-60 minutes. According to the present invention, a balanced high-density electrolytic capacitor can be realized. The capacitors so formed have a robust high-capacitance cathode, exhibit reduced equivalent series resistance (ESR), and benefit from vastly enhanced manufacturability due at least in part to the use of industrial components heretofore never employed in the fabrication of cathodes for use in electrolytic capacitors.

BRIEF DESCRIPTION OF THE DRAWINGS

The foregoing and other aspects and features of the present invention will be appreciated as the same becomes better understood by reference to the following detailed description of the various embodiments of the invention when considered in connection with the accompanying drawings, in which like numbered reference numbers designate like parts throughout. The drawings are not drawn to scale and are merely representative of just a few exemplary embodiments of the present invention. Other embodiments clearly within the scope of the present invention will be readily apparent to those of skill in the art, and each such embodiment is intended to be covered hereby, limited only by the claims appended hereto.

DETAILED DESCRIPTION OF THE ILLUSTRATED EMBODIMENTS

The present invention provides improved cathodes and methods for producing such cathodes for ultimate use in conjunction with valve metal capacitors. The family of cathodes according to the present invention can be produced so that they inhabit a pre-existing metallic surface such as an inner surface of a titanium casing adjacent to but insulated from direct electrical communication from an anode member. Foil-type valve metal anodes (such as aluminum) may be used in conjunction with the cathodes of the present invention; however, porous valve metal anodes (formed from metallic tantalum powder) are assumed for the purposes of the following description of the invention.

One embodiment of the present invention involves depositing a layer of carbon onto an inner surface of a titanium capacitor casing. The inner surface comprises titanium and may include a portion of the casing itself or one or more discrete titanium members disposed within said casing. Other embodiments of the present invention involve depositing a layer of oxides of any metal included in one or more of Group VII and Group VIII of the periodic table or chemical precursors for such oxides, e.g., chlorides or nitrides. For example, the metal oxides may include ruthenium dioxide ($RuO_2$), together with the oxide precursor $RuCl3$, iridium dioxide ($IrO_2$), manganese dioxide ($MnO_2$) together with the oxide precurser manganese nitride ($Mn(NO3)2$, silver vanadium oxide, $Ag_2V_4O_{11}$, vanadium pentoxide ($V_2O_5$), titanium dioxide ($TiO_2$), rhenium dioxide ($ReO_2$), osmium dioxide ($OsO_2$), molybdenum dioxide ($MoO_2$), rhodium dioxide ($RhO_2$), vanadium dioxide ($VO_2$), and tungsten dioxide ($WO_2$). The metal oxide may include one or more of these types of oxides and/or may include other metal oxides comprising metals in at least one of Group VII and Group VIII of the periodic table.

For a cathode usable in a wet electrolytic capacitor operatively coupled to an implantable cardioverter-defibrillator (ICD), the following approximate values and dimensions may be considered: The carbon cathode layer may occupy approximately 10 available square centimeters of surface area of titanium substrate. The total capacitance $C_{total}$ of any electrolytic capacitor consists of the sum of the two capacitors $C_{anode}$ and $C_{cathode}$ and is expressed by the formula $1/C_{total}=1/C_{anode}+1/C_{cathode}$. In order to maximize $C_{total}$, the capacitance $C_{cathode}$ has to be as large as possible. Thus the specific capacitance of the cathode should be on the order of about 5-10 $mF/cm^2$ or larger. A thin, processed layer of carbon deposited onto a titanium substrate may meet this specification. Other materials, which may meet this specification, include thin layers of oxides of any metal included in one or more of Group VII and Group VIII of the periodic table.

Figure 1:
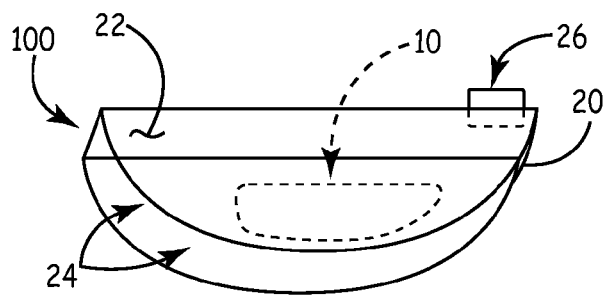
FIG. 1 is a perspective view of an exemplary titanium casing for a D-shaped capacitor illustrating a portion of one of the major interior surfaces that can serve as a substrate according to the present invention.

FIG. 1 is a perspective view of an exemplary titanium casing 20 for a D-shaped capacitor 100 illustrating a portion 10 of one of the major interior surface regions that can serve as a substrate according to the present invention. In practice, the entire interior of the casing 20 can be covered with an electrode coating fluid to form a major, continuous cathode produced according to the invention. The configuration depicted in FIG. 1 is known as a case negative design, wherein the cathode is intimately formed on the casing 20 and an anode member (not depicted) is electrically insulated from the casing 20. To enhance electrical communication between the cathode and external circuitry a tab member 26 can be fastened to a portion of the casing 20 in any convenient location. While the interior surface of the top cover 22 and the side-wall and bottom portion 24 can serve as the cathode for the capacitor, other portions 10 can be utilized as well. For other configurations of casing 20, such as a clam-shell type casing (not depicted) the interior of opposing halves of such a casing can serve as the cathode. According to the present invention various techniques may be employed for placing a coating of cathode material (denoted by reference numeral 25 in other drawings) on the interior of casing 20. While other techniques may be used, the techniques described herein are hereby expressly described and claimed herein.

Figure 2:
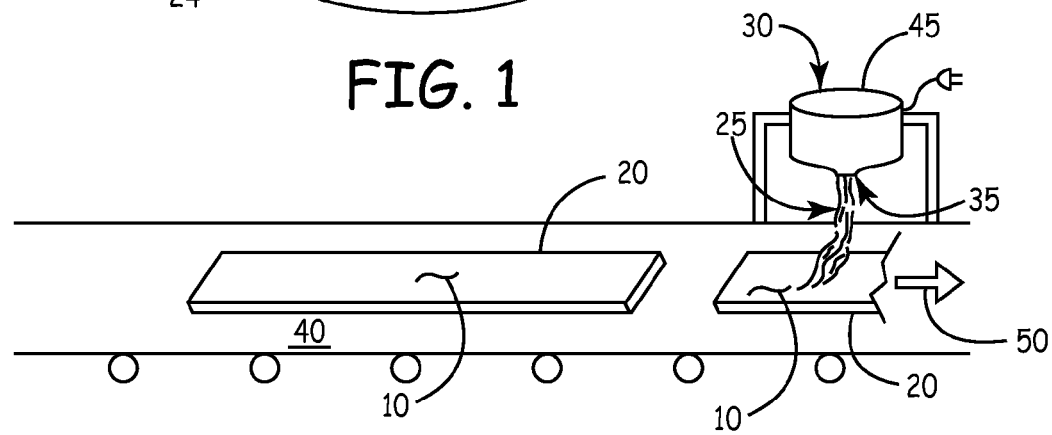
FIG. 2 is a perspective view of a system for depositing a cathode or a chemical precursor for a cathode onto a series of discrete pieces of titanium substrate wherein the pieces move past and/or about a stationary electrode coating fluid emitting apparatus. Preferably, the fluid emitting apparatus emits sequences of individual fluid droplets in this embodiment.

FIG. 2 is a perspective view of a system for depositing an electrode coating fluid material 25 onto a region 10 of a series of discrete pieces of titanium substrate 20 wherein the titanium pieces 20 are moved past a stationary carbon emitting apparatus 30. The apparatus 30 comprises a computer-controlled electrode coating fluid-emitting device having one or more discrete valves 35. The electrode coating fluid 25 preferably comprises a carbon-containing suspension or liquid prepared for compatibility with the electrode coating fluid-emitting device 30. Such a electrode coating fluid 25 may include distilled water, glycol, alcohol, or other suitable solvents or suspension carrier liquids and the like in order to maintain a desired combination of surface tension, viscosity, density, as is known in the chemical and industrial coating art. However, specifically for producing a carbonaceous cathode, the inventors have discovered one particularly useful precursor to the electrode coating fluid material 25 in the form of a relatively viscous graphite paste that, when diluted and treated, possesses the desired electrode coating fluid emission characteristic described hereinbelow. This precursor material is distributed by Johnson Matthey Public Limited Company ("Johnson Matthey") headquartered in the United Kingdom. In particular, one carbon-containing suspension can be readily converted to the desired characteristics of the present invention; namely, the model P5900 graphite ink (also referred to herein as a paste) sold worldwide by Johnson Matthey. This paste has known use as an undercoat for silver paste coating in the production anodes for tantalum capacitors using a process wherein the anode are to be dipped in the paste prior to receiving a coat of silver paste. In contrast, in the context of certain embodiments of the present invention, this paste serves as a precursor material for the preparation of the electrode coating fluid material 25 utilized in the preparation of a discrete cathode element, or elements, for wet tantalum electrolytic capacitors. Thus, although the paste is apparently specially formulated and required for use with silver pastes in the P5000 model range offered by the same entity, according to the invention the reformulated carbon-containing paste is all that is required to fabricate effective cathodes. Although the graphite paste appears to be exclusively offered for use with components and parts that are immersed or dipped into the paste, it also offers many features not seen with other graphite pastes available on the market. For example, the paste offers the following characteristics which carryover from the precursor paste to the fully formulated electrode coating fluid material 25: excellent film-forming properties, absence of blotting and no washing required, provides a relatively regular surface configuration, has a very slow settling rate, and provides consistent electrical characteristics. The graphite paste includes the following physical properties: a solids content of about 5.5% to about 6.5%; a viscosity of about 75 centipoise (cps) to about 85 cps (by Brookfield RVT with spindle at 150 rpm, 25 degree Celsius) and a shelf life of about six months. In order to preserve the paste for the stated shelf life the paste material should be stored in a sealed container at between about 15 to 20 degrees Celsius. In addition, the following processing guidelines apply to the paste. The paste needs to be well-mixed before use and to ensure complete dispersion it is recommended that the container containing the paste and the subsequently formulated electrode coating fluid material 25 is agitated (e.g., rolled, shaken, etc.) thoroughly before use. According to the invention, the paste is reformulated to lower the viscosity of the electrode coating fluid material 25 by the addition of an appropriate amount of a thinning agent such as alcohol, glycol, de-mineralized or distilled water and/or other solvents. The paste should be maintained above a pH of about nine during use and the pH can be adjusted by adding a 1:1 mixture of water to 0.880 ammonia solution.

Continuing with reference to FIG. 2, the resulting electrode coating fluid 25 present in the reservoir 45 should be agitated (e.g., stirred, vibrated and/or re-circulated and the like). In a primary embodiment of the invention the electrode coating fluid 25 is suitably conditioned to allow for the controlled emission from the piezo-electrically controlled valve 35 as droplets are released due to pressure applied to the electrode coating fluid 25 residing in the reservoir 45. For example, a reservoir for an available piezoelectric ink jet print head can be filled with the electrode coating fluid 25 which is suitably diluted and conditioned to an appropriate viscosity, surface tension, density and the like. Depending on the droplet generator 30 employed other fluid characteristics may need to be considered.

The piezo-electrically controlled valve is opened and closed by applying a pulsed electrical potential difference across the closing member of the valve. Pulsing the potential difference using pulse durations in the lower millo-second range may result in the emission of small, 10 nano- to 10 micro-liter size droplets of electrode coating fluid. Therefore, pressure and pulse timing completely and precisely control the droplet volume. This is of paramount importance for obtaining a homogenous coating. The controlled motion of one or multiple preformed substrates underneath the exit aperture of the valve precisely determines the placement of the individual droplet on the substrate. No masking of areas on the substrate where a coating would be undesired is therefore required.

Figure 3:
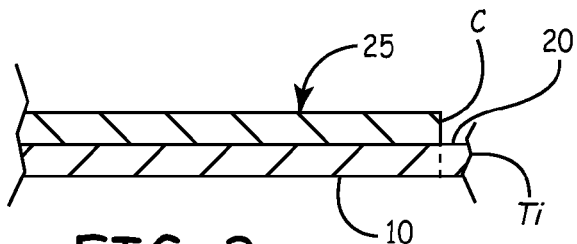
FIG. 3 is an elevational cross-sectional view of titanium surface interface with a cathode layer deposited thereon. In case a carbonaceous slurry or suspension is being used, subsequent vacuum heat processing results in the formation of an interfacial layer of titanium carbide (TiC). This layer advantageously stabilizes the carbon cathode and lowers its electrical resistance.

Referring to FIG. 3, which is an elevational view in cross section of a portion 10 of the titanium substrate 20 having carbon electrode coating fluid 25 deposited thereon. As can be appreciated with reference to FIG. 2, in the context of the present invention consistent droplet volumes comprise beneficial features of the invention. The droplet emission characteristics of the piezo-electrically controlled dosing valve advantageously provide for more uniform and consistent coatings of the substrate 10 with complete coverage, as is desired for the currently inventive techniques.

Figure 4:
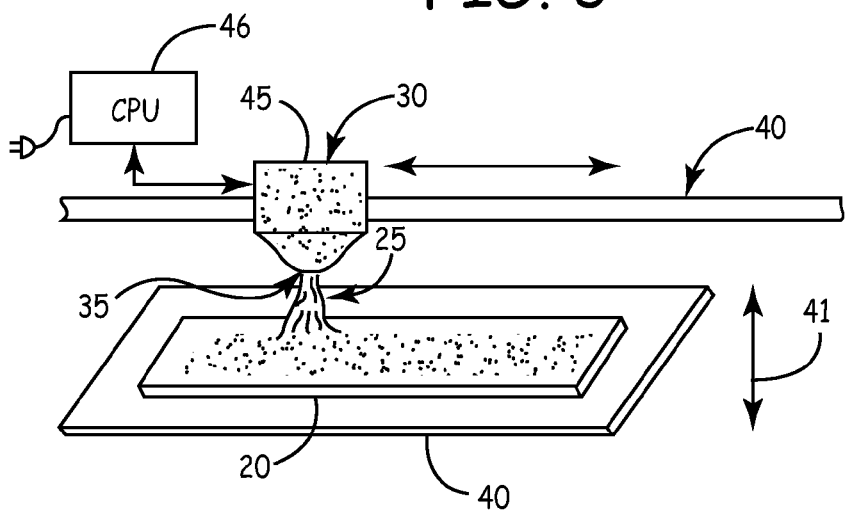
FIG. 4 is a perspective view of a system for depositing a cathode onto a discrete piece of titanium substrate wherein printing head (or cathode-coating fluid-emitting apparatus) reciprocates back and forth as it emits electrode coating fluid material onto the substrate.

Referring to FIG. 4, discrete substrates 20 receive a relatively consistent level of the electrode coating fluid material 25 over the upper surface portion 10 wherein printing head (or cathode-coating fluid-emitting apparatus) reciprocates back and forth as it emits electrode coating fluid material onto the substrate. Then certain post-processing is performed (as described herein below) and the substrate 20 and processed electrode coating fluid 25 comprises a finished cathode member. While not depicted, the reservoir 45 can be remotely fluidly coupled to the apparatus 30 and the agitation performed manually or via an impeller or the like.

Figure 5:
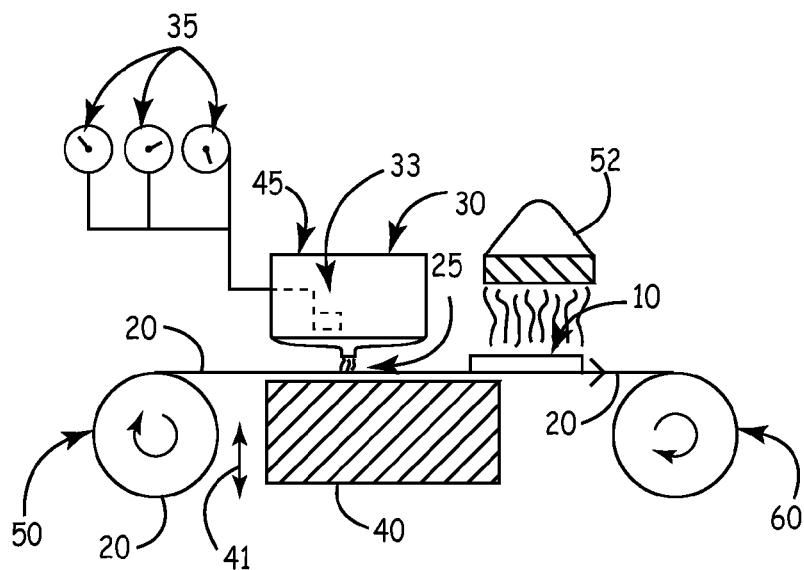
FIG. 5 is a perspective view of another embodiment of a system for depositing a cathode onto a continuous roll of titanium substrate wherein the substrate moves past a stationary cathode coating fluid emitting apparatus. Preferably, the fluid emitting apparatus emits a plurality of droplets in the form of a mist in this embodiment.

FIG. 5 is an elevational view schematically depicting a source roll of titanium substrate 20 feeding the substrate across the articulated platform 40 (as indicated by various arrows and arrow 41). Following deposition of the electrode coating fluid in the form of a plurality of droplets or mist 25 on each portion 10 a source of thermal energy 52 expedites drying of the electrode coating fluid 25 present on the portion 10 (as indicated by curved lines between the source 52 and the portion 10. The source of thermal energy 52 can comprise infrared or ultraviolet radiation and the like and convective heating can be enhanced with an internal fan to circulate the heated air around the portion 10 and to begin to drive off some of the components of the electrode coating fluid 25. As depicted in FIG. 5 a take-up spool 60 receives the substrate 20 and the portions 10 having the electrode coating fluid 25 disposed thereon. However, the portions 10 could be severed and stored or subject to post-processing as described hereinbelow.

Figure 6:
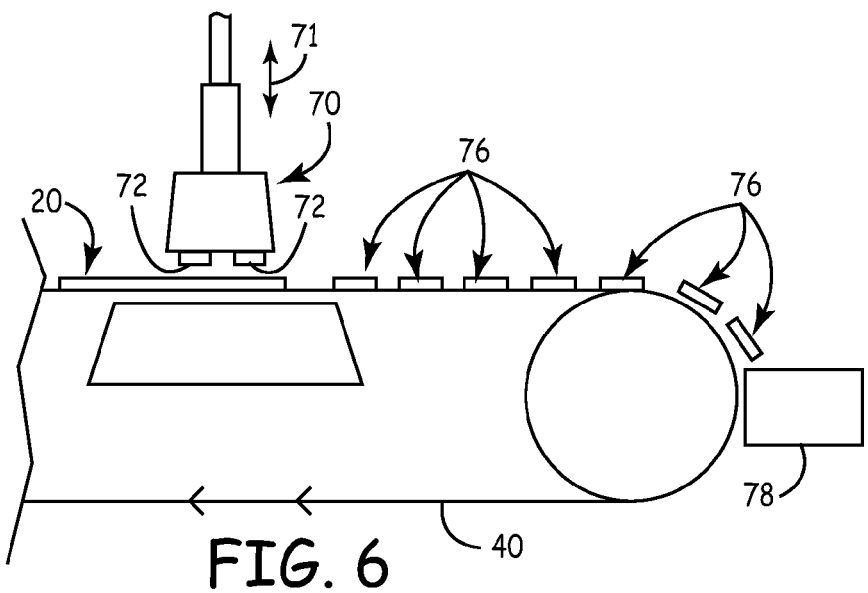
FIG. 6 is an elevational view schematically representing both a representative case-stamping apparatus and/or a die-cutting apparatus for slicing substantially flat portions of the finished substrate into electrodes disposed between opposing anodes.

Depicted in FIG. 6 is an elevational view schematically representing both a representative case-stamping apparatus and/or a die-cutting apparatus 70 for slicing substantially flat portions of the finished substrate 20 into electrodes disposed between opposing anodes. This configuration is known as a case positive or a case neutral configuration depending on whether or not the anode electrically couples to the case (22,24 in FIG. 1). In general, apparatus 70, moveably controlled to proximity with substrate 20, is pressed onto the substrate 20 to either cut the fully post-processed substrate 20 into desired sub-units, or to stamp the substrate 20 into a desired three-dimensional shape. Thus, the head of the tool can correspond to the dimensions of a finished electrode unit such as a half of the case for capacitor 100 (24 in FIG. 1) and may, if desired, be used to form the physical dimension(s) of the substrate 20 to a configuration or shape corresponding to other components of the capacitor (or interior portion of the electrical device in which the capacitor is placed).

In the case-stamping configuration form depicted in FIG. 6 the apparatus 70 forms the lower portion of a capacitor casing (such as depicted in FIG. 1) for an anode prior to deposition of electrode coating fluid 25. The apparatus 70 includes at least one die 72 that periodically oscillates vertically (as denoted by arrow 71) and contacts substrate 20 to form discrete parts 76. The parts can be moved on conveyor 40 and optionally collected in bin 78 for inspection and/or packaging. As noted the discrete parts 76 can comprise either single- or dual-sided flat plate cathode members wherein the portion 10 covers one or both sides of the substrate 20. Alternatively, the parts 76 can comprise one or both halves of a casing 22,24 for a capacitor 100.

Thus, according to various forms of the invention a titanium substrate 20 is serially processed by an electrode coating fluid 25 deposition emission apparatus 30. Various form of the invention include motion control system for articulating the valve-based electrode coating fluid-emitting apparatus 30 into proximity with the substrate. In yet another form of the invention a source of substantially flat substrate material is conveyed past the piezo-electrically controlled printing valve(s) or print head(s). Of course, the substrate 20 can be conveyed substantially continuously or stepped forward (or in reverse as desired to maximize desired results). According to the invention, one or opposing sides of a flat portion of substrate 20 (or peg, pin or diverse shapes of titanium—not depicted) can be coincidentally or serially coated with the carbon electrode coating fluid 25 and, optionally, a subsequent processing step can comprise a cutting operation wherein a predetermined discrete cathode unit is derived from a larger portion of substrate material 20 (e.g., a sheet or portion of a roll of substrate material).

With respect to droplet volume (or size), in one form of the invention the droplet volume can be dynamically controlled from about ten nano-liters or greater with an resulting thickness of electrode coating fluid 25 deposited upon the substrate 20 of between about one micrometers and about 40 micrometers and a capacitance value of between about five millifarads per square centimeter of surface area to about 10 millifarads per square centimeter or more.

With respect to the substrate, in one form of the invention the substrate comprises a titanium material having either a relatively smooth or roughened surface portion, with a material thickness in either case of about 0.5-20 mils (or X or Y multiplied by 0.001 inches). In the event that a roughened titanium substrate is utilized, various means of pre-processing the substrate can be used (e.g., etched, sanded or pneumatically blasted with particulate material). Following such pre-processing of the substrate the thus roughened surface should have a roughness average (RA) of about 33 microinches, although other RA values may be utilized successfully in practicing the present invention.

Figure 7:
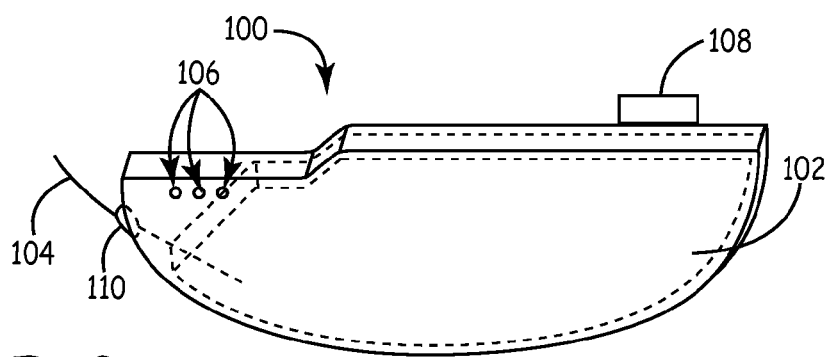
FIG. 7 is a perspective view of another exemplary titanium casing for a modified D-shaped capacitor illustrating the various interior and external components of the capacitor.

FIG. 7 depicts a perspective view of a capacitor 100 fabricated according to the present invention. In FIG. 7, the anode 102 closely conforms to the interior of the titanium casing for the capacitor 100 and an elongated conductor 104 extends from the anode 102 (including a conductive feedthrough pin). Fill ports 106 formed in a portion of the casing allow the liquid electrolyte to enter the interior of the capacitor 100 after the cover and bottom portion of the casing are welded together. After the electrolyte fills the interior of the capacitor 100, the fill ports 106 are sealed (e.g., laser welded). An optional conductive tab 108 couples the exterior of the capacitor 100 to remote circuitry in a case negative configuration wherein the cathode (not depicted in FIG. 7) covers all or a portion of the interior surfaces of the casing for the capacitor 100. While a D-shaped capacitor is depicted in FIG. 1 and a modified D-shaped is depicted in FIG. 7, no limitation should be inferred therefrom. In fact, any number of arbitrary shaped casings can be realized according to the invention and consistent with the ability to configure a tantalum slug anode into any of a variety of diverse regular and irregular shapes (geometric, organic, and otherwise).

Figure 8A:
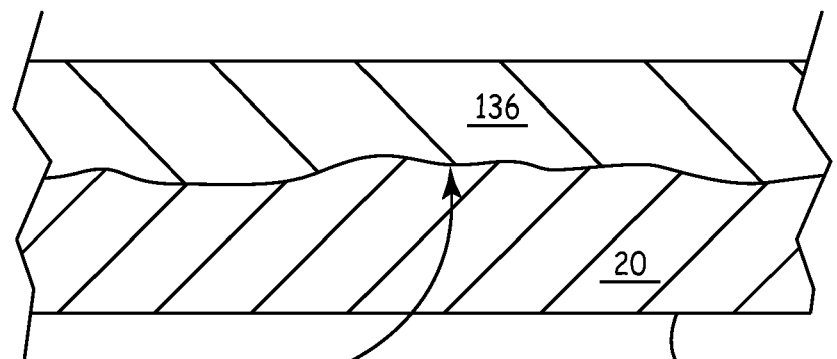
FIG. 8A-8C depict elevational cross-section views depicting the processing of various embodiments of a carbon cathode disposed on a titanium substrate according to the present invention.
Figure 8B:
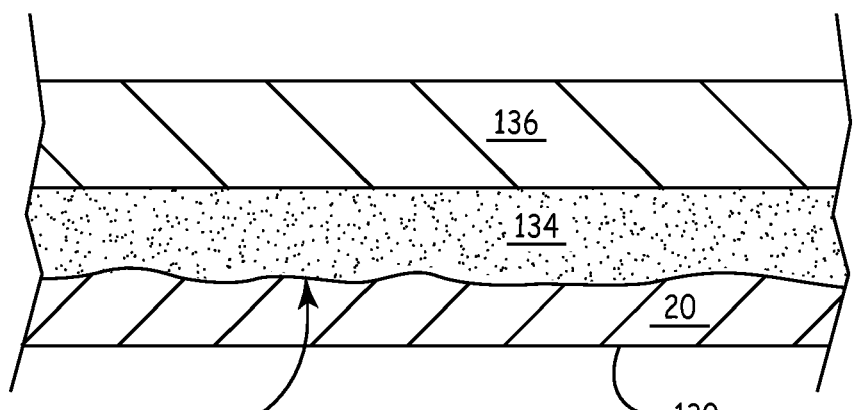
Figure 8C:
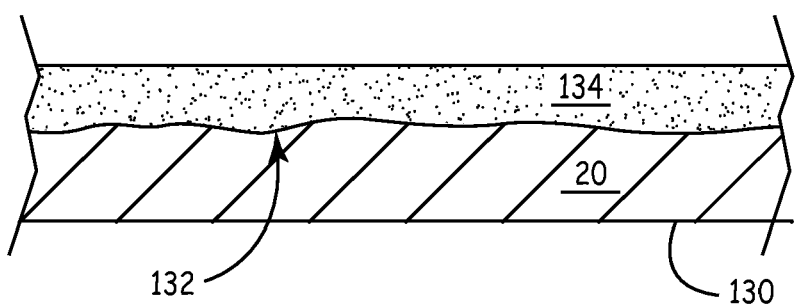

Referring now to FIG. 8A-8C (with reference back to FIG. 3 which is an elevational cross-sectional view of a portion 10 of substrate 20 having the electrode coating fluid in the form of a carbonaceous slurry 25 deposited thereon), to form an interfacial titanium carbide (TiC) at the carbon-titanium interface. The method or process 200 of preparing the electrode 100 is now described with reference to FIG. 8A-8C. For ease of reference, a flow diagram illustrating such a method or process 200 is provided as FIG. 9.

Figure 9:
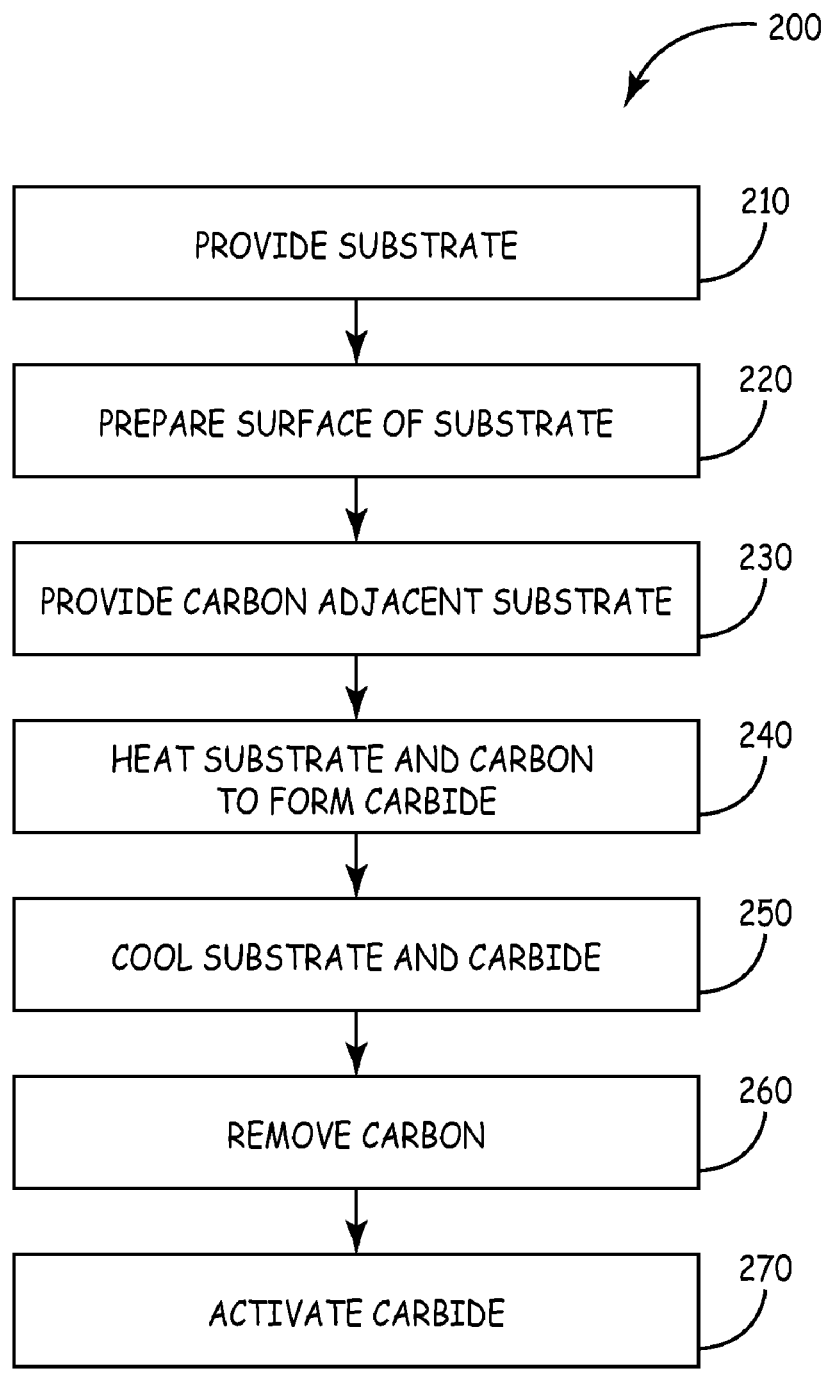
FIG. 9 is a flow chart depicting a method of providing carbon on a titanium substrate and treating the carbon and substrate according to one embodiment of the invention.

As depicted in FIG. 8A and FIG. 9, the substrate 20 is provided in a step 210. As previously described, the substrate 20 comprises titanium or a titanium alloy and is provided as a part of an enclosure for an electrochemical cell, or a portion of a foil or sheet of titanium metal having opposing major surfaces 130,132.

In a step 220, the surface 132 of the substrate 20 is altered or deformed to have a relatively rough characteristic or configuration. Various methods may be used to provide the surface 132 with its relatively rough surface finish. For example, according to an exemplary embodiment, a grit blasting technique may be utilized to alter the surface 132.

According to another embodiment, the substrate 20 may be provided with a roughened surface portion (at 132) without the need to perform a separate processing step. For example, sintered metal particles (e.g., sintered titanium) may be deposited on a metal sheet surface (e.g., a titanium sheet) using a vacuum sintering process.

Referring to FIG. 9, in a step 230, a carbon layer 136 (e.g., a layer of carbon containing material) is provided adjacent at least a portion of the substrate 20. According to another embodiment, the carbon layer 136 may be provided as a suspension of carbon or graphite powder in alcohol (e.g., methanol, isopropanol, etc.), and may be provided in either a polymerizable or non-polymerizable form. Preferably, a commercially available starter or pre-cursor material with known and controlled properties such as the Johnson Matthey P5900 product may be used.

The carbon layer 136 may be deposited or formed by means as described and depicted herein. The carbon layer 136 may be provided using a piezo-electrically controlled valve emitting a sequence of individual droplets if a coating with a precise edge definition is required or it may be provided using a single valve or multiple valves emitting a plurality of droplets in the form of a mist if a coating of a large area of substrate, for example a roll-fed sheet of titanium is to be coated. The particular deposition method employed should be chosen based on a variety of factors, including cost, and desired characteristics for the deposited material.

As shown in FIGS. 8A and 8B, in a step 240, the substrate 20 and the carbon layer 136 are heated to a temperature of between approximately 180° and 1000° C. at a pressure of approximately $10^{-6}$ Torr for approximately 1 hour (e.g., between approximately 30 and 90 minutes). During this vacuum baking step, alcohol provided with the carbon-containing material is evaporated and/or pyrolized. At least a portion of the carbon atoms included in the layer of carbon material 136 chemically react with metal atoms to form a carbide layer 134. For example, according to an embodiment in which the substrate is made of titanium, a titanium carbide layer 134 forms during the vacuum baking step 240.

In a step 250, the substrate 20, the carbide layer 134, and the unreacted carbon layer 136 is cooled to a temperature of between approximately 20° and 100° C.

The substrate 20, the carbide layer 134, and the unreacted carbon layer 136 are heated in a step 260 to a temperature of between approximately 300° and 500° C. in an oxygen-containing ambient or atmosphere (e.g., air, pure oxygen, etc.) for a period of between approximately 30 and 90 minutes. In this step, at least a portion of the unreacted carbon layer 136 is activated such that oxygen-containing functional groups such as CO, COOH, and C=O are created to form an activated carbon region. That is, a carbonaceous layer is formed from the carbon layer 136 that includes an activated carbon surface portion and an unreacted or non-activated carbon sub-surface portion (which may have a thickness less than the unreacted carbon layer according to one embodiment). The unreacted carbon portion includes nonactivated carbon-containing material. According to an alternative embodiment, the entire unreacted carbon portion is converted to activated carbon such that there is no unreacted carbon left in the carbonaceous layer.

The relative thicknesses of the activated carbon surface portion and the unreacted carbon sub-surface portion are a function of the amount of time that elapses during the activation step. According to an embodiment, the thickness of the unreacted carbon layer can comprise approximately 5 to about 20 microns after heating at approximately 450 degrees Celsius for approximately 30 minutes to render an activated layer approximately 0.5 to about 5 microns in depth.

According to the present invention, a wet electrolytic valve metal capacitor can be fabricated having a reduced ESR and enhanced manufacturability due to the variety of techniques for, and ease of, deposition of a carbon cathode on a portion of a capacitor canister or other planar substrate.

The invention claimed is:

1. A method of fabricating a cathode, comprising:
    emitting a sequence of individual droplets of an electrode coating fluid onto a portion of a titanium substrate from at least one orifice of a piezoelectrically controlled valve, wherein the electrode coating fluid comprises a suspension of graphite powder in a carrier liquid to form a deposited carbon coating on the titanium substrate; and
    converting the entire deposited carbon coating to a single layer of activated titanium carbide layer on the titanium substrate.

2. A method according to claim 1, wherein emitting a sequence of individual droplets includes emitting of a series of individual droplets of a coating fluid by a plurality of micro-dosing valves emitting individual droplets onto a portion of a titanium substrate.

3. A method according to claim 1, further comprising:
    reciprocating the valve in proximity with the substrate during emitting a sequence of individual droplets.

4. A method according to claim 1, wherein the activated titanium carbide layer has a depth of about 0.5 micrometers to about 5 micrometers.

5. A method according to claim 1, wherein the substrate comprises a preprocessed substrate having a region of roughened surface features.

6. A method according to claim 1, wherein the electrode coating fluid comprises a material having a solids content of between about two percent and twenty percent.

7. A method according to claim 1, wherein the electrode coating fluid comprises a paste material, the paste material having viscosity of about 75 centipoise to about 85 centipoise.

8. A method according to claim 1, wherein converting the entire deposited carbon coating to a single layer of activated titanium carbide layer on the titanium substrate includes heating the deposited carbon coating and the titanium substrate at between about 600 degrees to about 1,000 degrees Celsius at a reduced pressure and/or under a chemically inert cover gas and further heating in an oxygen-containing atmosphere for between about 0.1 hour to about four hours at temperatures between 200 degrees and 500 degrees Celsius.

9. A method according to claim 1, wherein the titanium substrate comprises an interior portion of an electrochemical cell housing.

10. A method according to claim 1, wherein the titanium substrate comprises a portion of a sheet of titanium or a portion of a rolled-sheet of titanium.

11. A method according to claim 10, further comprising:
    emitting the electrode coating fluid on opposing major surfaces of the sheet of titanium.

12. A method according to claim 10, further comprising:
    cutting the thin sheet of titanium into smaller units.

13. A method according to claim 1, further comprising:
    covering the cathode with a dielectric separator material.

14. A method according to claim 13, wherein the dielectric separator material comprises at least two discrete layers of dielectric separator material.

15. A method according to claim 13, wherein the dielectric separator material comprises a polypropylene material.

16. A method according to claim 1, wherein the valve fluidically communicates with a major reservoir containing a volume of the electrode coating fluid.

17. A method according to claim 16, further comprising means for agitating at least a portion of the volume of electrode coating fluid contained within the major reservoir.

18. A method according to claim 17, wherein the means for agitating includes at least a one of: stirring the electrode coating fluid, shaking the major reservoir, ultrasonically impinging upon the electrode coating fluid, re-circulating the electrode coating fluid, vibrating the electrode coating fluid.

19. A method according to claim 16, further comprising monitoring the characteristics of the electrode coating fluid contained within the major reservoir.

20. A method according to claim 19, wherein monitoring further comprises at least a one of:
    measuring a temperature of the electrode coating fluid, measuring a pH level of the electrode coating fluid, measuring a specific gravity of the electrode coating fluid, measuring a viscosity of the electrode coating fluid, measuring a remaining volume of the electrode coating fluid, measuring a rate-of-depletion of the electrode coating fluid, measuring a particulate content of the electrode coating fluid.

21. A method according to claim 20, further comprising providing a signal related to at least one of the measured metrics of the electrode coating fluid.

22. A method according to claim 21, wherein the signal comprises at least one of:
a visual signal, an auditory signal, a tactile signal.

23. A method according to claim 22, further comprising, in response to receipt or acknowledgement of certain characteristics of the signal, performing one of:
ceasing the emission of the electrode coating fluid from the actuated valve, altering an operating parameter of the emission of the electrode coating fluid from the actuated valve, modifying a characteristic of the electrode coating fluid.

24. A method according to claim 23, wherein modifying the characteristic of the electrode coating fluid comprises one of:
adding a solvent to the electrode coating fluid, modifying the temperature of the electrode coating fluid, adding an additional amount of electrode coating fluid to the major reservoir, agitating the electrode coating fluid.

25. A method according to claim 1, further comprising initially altering the temperature of the titanium substrate.

26. The method of claim 1, further comprising emitting the sequence of droplets at a rate of about 500 Hz.

27. A method of fabricating a cathode, comprising:
forming an electrode coating fluid from a suspension of graphite powder in a liquid carrier;
filling a reservoir of a piezoelectric print device with the electrode coating fluid;
emitting a sequence of individual droplets of the electrode coating fluid onto a titanium substrate from an orifice of a piezoelectrically controlled valve coupled to the print device to form a deposited carbon coating on the titanium substrate; and
converting the entire deposited carbon coating to a single layer of activated titanium carbide layer on the titanium substrate.

28. The method of claim 27, wherein the micro dosing valve is computer-controlled.

29. The method of claim 27, further comprising emitting the sequence of individual droplets at a rate of about 500 Hz.

30. The method of claim 27, wherein the titanium substrate is a portion of an inner surface of an enclosure of an electrochemical cell.

31. The method of claim 27, wherein converting the entire deposited carbon coating to a single layer of activated titanium carbide layer on the titanium substrate includes:
heating the deposited carbon coating and the titanium substrate at between about 600 degrees to about 1,000 degrees Celsius at a reduced pressure and/or under a chemically inert cover gas to form an activated titanium carbide layer between a remaining layer of the deposited carbon coating and the titanium substrate;
cooling the remaining layer of the deposited carbon coating, the activated titanium carbide layer and the titanium substrate; and
heating the remaining layer of the deposited carbon coating, the activated titanium carbide layer and the titanium substrate in an oxygen-containing atmosphere to form a cathode consisting of a single activated titanium carbide layer on the titanium substrate.

32. A method of fabricating a cathode, comprising:
forming an electrode coating fluid from a suspension of graphite powder in a liquid carrier;
filling a reservoir of a print device with the electrode coating fluid;
emitting a sequence of individual droplets of the electrode coating fluid onto a titanium substrate from an orifice of a valve coupled to the print device to form a deposited carbon coating on the titanium substrate;
heating the deposited carbon coating and the titanium substrate to form an activated titanium carbide layer between a remaining layer of the deposited carbon coating and the titanium substrate; and
removing the remaining layer of the deposited carbon coating to expose the activated titanium carbide layer on the titanium substrate.

* * * * *